United States Patent

Humes

[15] 3,689,107
[45] Sept. 5, 1972

[54] STEERING ASSEMBLY FOR TRAILERS
[72] Inventor: Carl E. Humes, 907 Franklin Ave., Steubenville, Ohio 43952
[22] Filed: April 19, 1971
[21] Appl. No.: 135,243

Related U.S. Application Data

[63] Continuation-in-part of Ser. No. 93,685, Nov. 30, 1970.

[52] U.S. Cl. ................................280/426, 280/34 A
[51] Int. Cl. ............................................B62d 53/06
[58] Field of Search............280/426, 81 R, 81 B, 442

[56] References Cited

UNITED STATES PATENTS

| 3,102,735 | 9/1963 | Bigge | 280/81 |
| 3,195,922 | 7/1965 | Humes | 280/426 |
| 3,533,644 | 10/1970 | Humes | 280/426 |

FOREIGN PATENTS OR APPLICATIONS

| 223,492 | 9/1962 | Austria | 280/426 |

Primary Examiner—Leo Friaglia
Attorney—Stowell & Stowell

[57] ABSTRACT

An improved steering mechanism for a tractor driven plural wheeled extendable trailer wherein the motive force for steering the trailer positively extends from the fifth wheel of the tractor in the form of tie members which are changeable in length to one or more turntables supporting assemblies structurally associated with one or several steerable axle assemblies supporting the trailer with means being provided for varying and limiting the degree of turning movement of each turntable assembly to maintain all of the steerable axle assemblies in proper steering relation to the tractor substantially regardless of the operating length of the trailer. Further means are provided on at least one of the turntables which prevents the turntable from turning or if turned causes the turntable to return to the straight tracking position. Mechanism associated with such further means may be actuated upon actuation of the trailer and/or tractor brakes.

10 Claims, 12 Drawing Figures

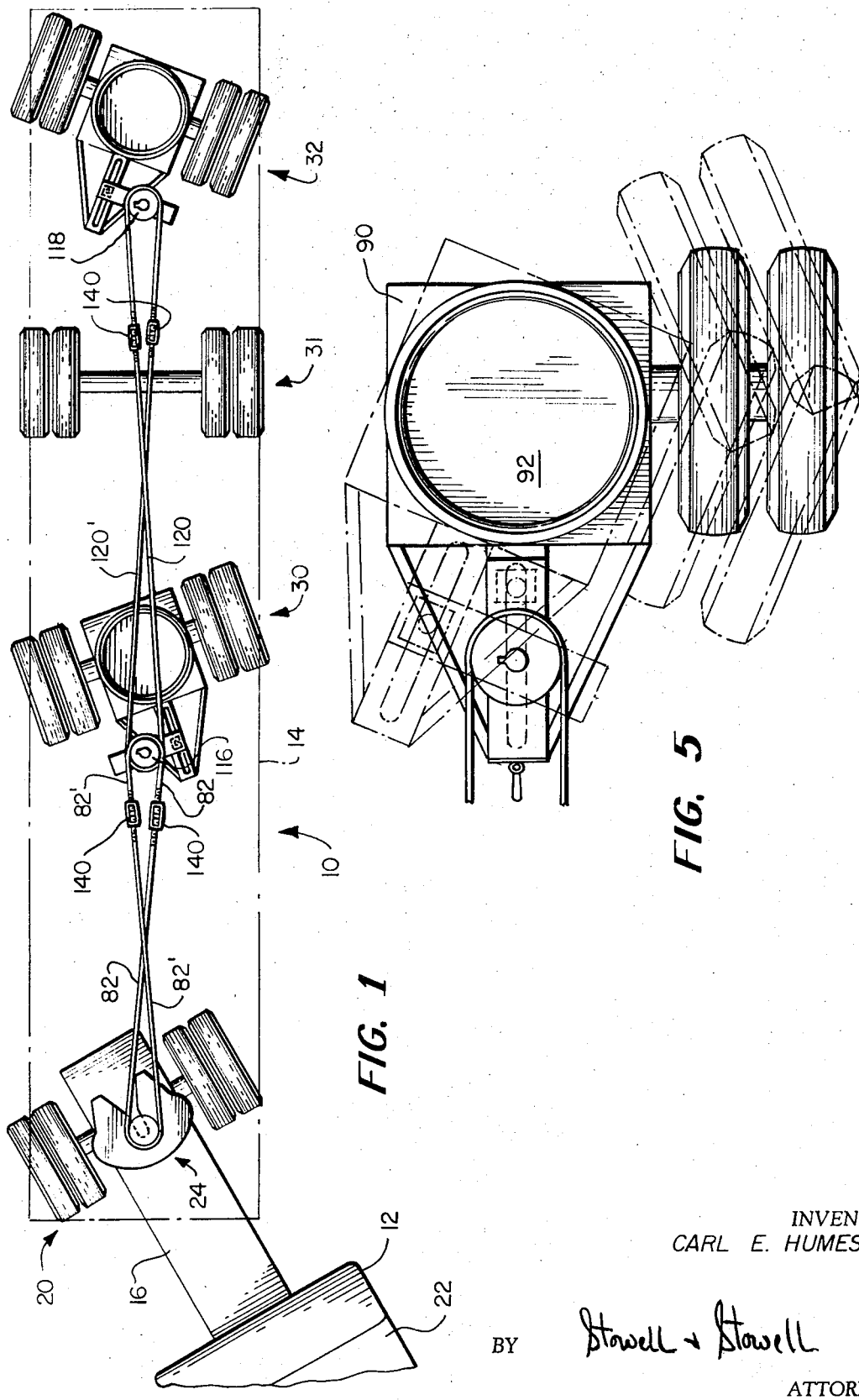

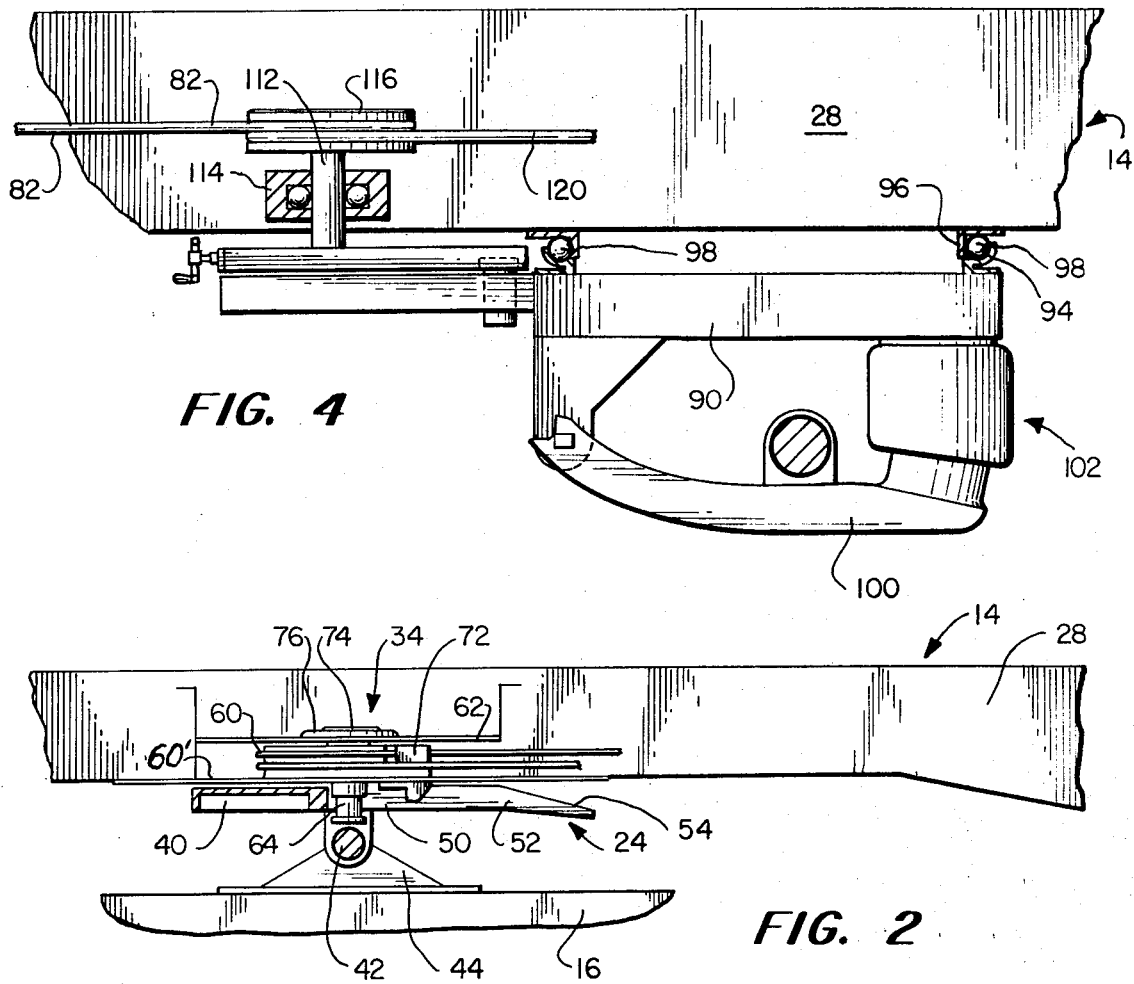
FIG. 4
FIG. 2
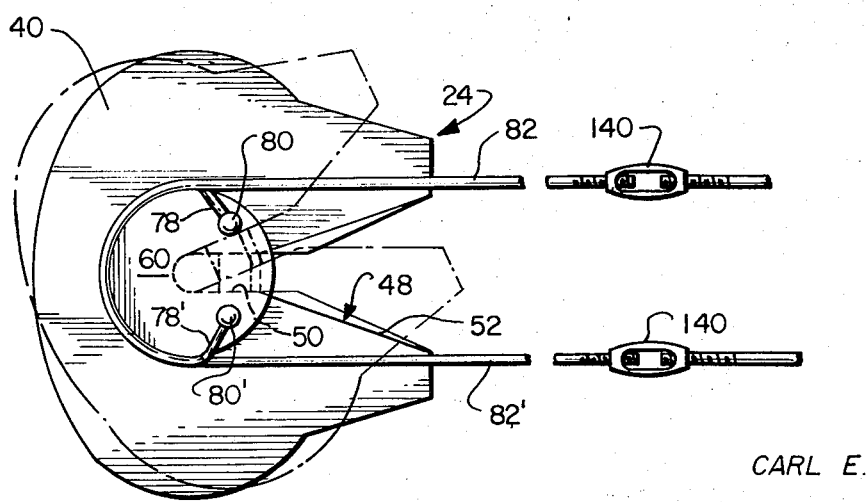
FIG. 3
INVENTOR
CARL E. HUMES

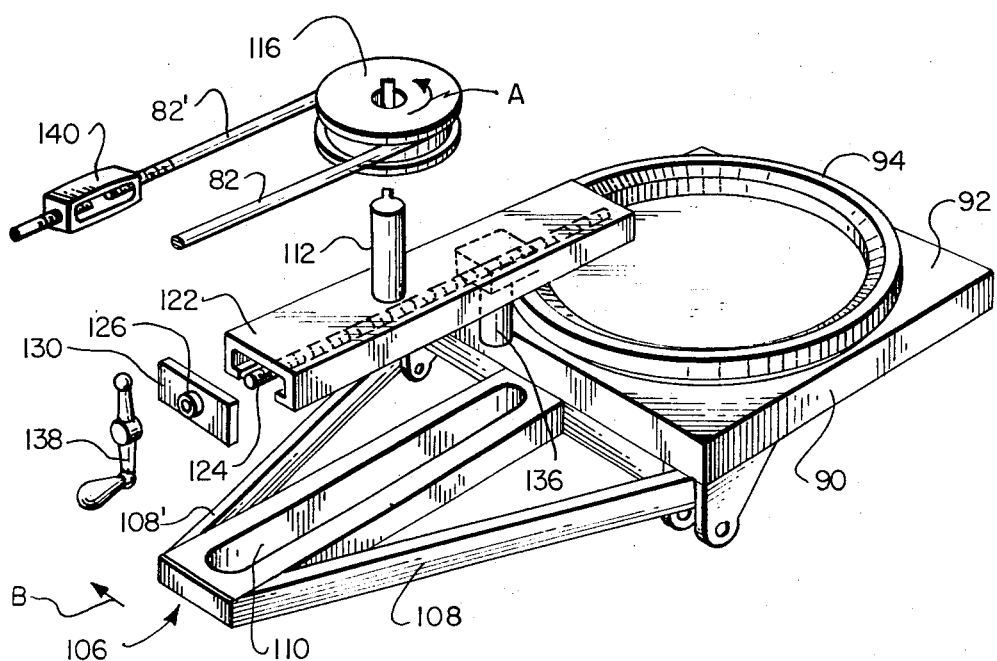
FIG. 6
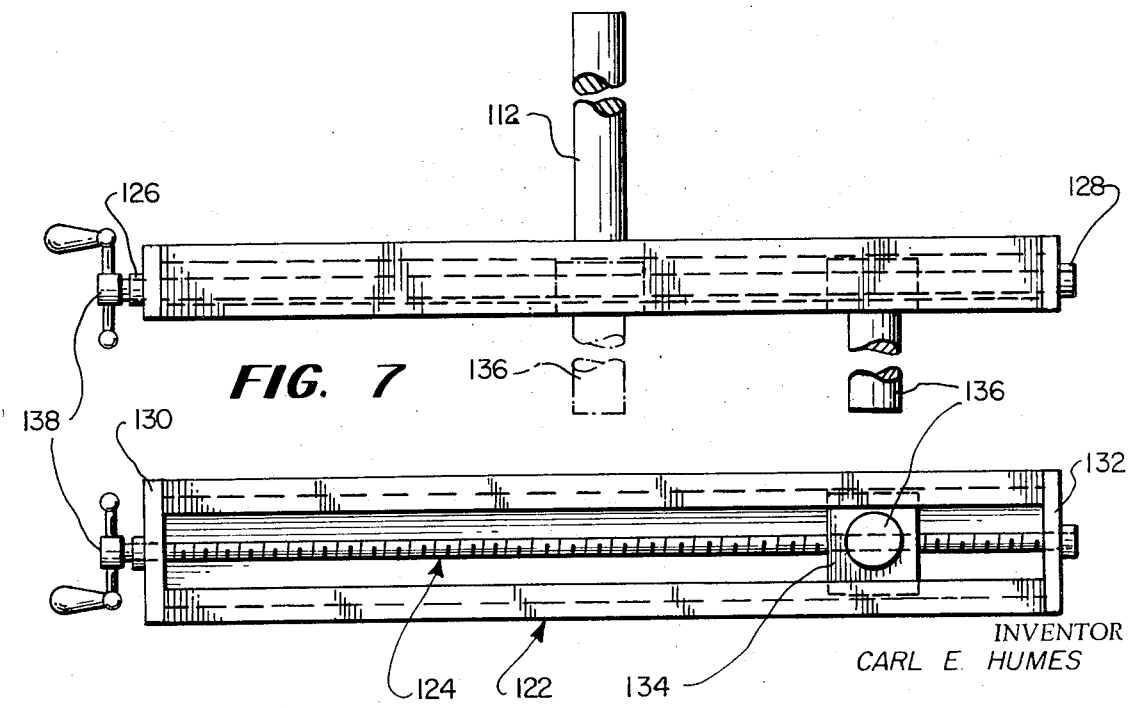
FIG. 7
FIG. 8
INVENTOR
CARL E. HUMES
BY Stowell & Stowell ATTORNEY

INVENTOR
CARL E. HUMES

BY Howell + Howell ATTORNEY

STEERING ASSEMBLY FOR TRAILERS

This application is a continuation-in-part of my co-pending application Ser. No. 93,685, filed Nov. 30, 1970.

BACKGROUND OF THE INVENTION

1. Field of the Invention

This invention generally appertains to improvements in tractor-trailer assemblies and more particularly relates to new and novel improvements in steering assemblies for expandable trailers whereby the steerable wheeled axle assemblies of a trailer are positively steered by the movements of the towing tractor when the trailer is in the diminished or extended positions or any desired intermediate position and to anti-jackknife means therefor.

2. Description of The Prior Art

My prior U.S. Pat. No. 3,195,922, issued July 20, 1965, is exemplary of the state of the prior art in that it shows the front end of a trailer pivotally connected by a king pin to the fifth wheel of a tractor with the fifth wheel including a rearwardly opening king pin receiving slot and the rearward end of the trailer supported on pivotally mounted steerable wheeled axle assemblies. The steerable axle assemblied are connected to the fifth wheel of the tractor by chain and sprocket connections whereby turning of the tractor fifth wheel is translated into cooperative turning movement of the wheeled steerable axle assemblies of the trailer with such turning of the trailer steerable axle assemblies being predetermined and varying from a maximum at the beginning of a turn and decreasing as the tractor's degree of turn increases. My co-pending application Ser. No. 93,685 discloses improved steering means for extendable trailers whereby the steering control may be varied as the trailer is shortened or lengthened.

SUMMARY OF THE INVENTION

The present invention constitutes new and novel improvements over the disclosed construction and assembly in the foregoing patent and application as applied to extendable plural service trailers.

It is a principal object of the present invention to provide an improved steering assembly for extendable trailers including means for cooperatively steering wheeled axle assemblies for extendable trailers adapted to be towed by tractors.

It is an object of the present invention to provide such an improved steering mechanism which may be readily applied to trailers having two, three, four or more wheeled axles and various combinations of the wheeled axles may be steered cooperatively to substantially eliminate sliding or dragging motion between the wheels of the trailer and the roadway when the trailer is in its diminished or extended positions.

It is another object of the present invention to provide such a system for varying the relative pivotal motion between the tractor and the trailer axle assemblies.

It is another important object of the present invention to provide such cooperative steering mechanisms wherein all of the wheeled axles may be moved in one direction and the degree of movement of each of the plural axles of the trailer may be readily controlled and varied merely by means of simple cranks for varying the location of control pins connecting lever arms associated with the wheeled axle assemblies.

Another important object of the present invention is to provide such cooperative steering mechanisms for tractor pulled extendable trailers wherein the motive force for operating the steering mechanism is positively obtained from the fifth wheel of the tractor.

A further important aspect of the invention resides in automatic and positive anti-jackknife means associated with one or more of the wheeled axle assemblies and the braking system for the vehicle.

Another object of the invention is to provide improved cooperative steering means for tractor hauled extendable trailers that is relatively simple in construction, rugged and relatively inexpensive to install and maintain.

These and other objects and advantages are generally provided in a multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, at least one wheeled axle assembly for the trailer, means mounting the wheeled axle assembly for controlled pivotal movement relative to the trailer main frame, said mounting means including a vertical shaft mounted on the trailer frame for rotation relative thereto, a first lever arm secured to rotate with the shaft, a king pin carried at the forward end of the trailer, a plate mounted concentric to the king pin, a depending arm secured to the plate eccentric to the king pin and adapted to be snugly received in the fifth wheel slot rearwardly of the king pin, a second lever arm secured to rotate on a vertical axis, an adjustable slide member carried by the second lever arm, means pivotally connecting one end of the slide member to said first lever arm, and tie members connecting the second lever arm and the plate outboard of their pivotal axes.

This invention will be more particularly described in reference to the accompanying drawings wherein:

FIG. 1 is a top plan view of a tractor and extendable trailer assembly shown in phantom lines with each having incorporated thereon the improved steering mechanism of the invention;

FIG. 2 is an enlarged fragmentary partial sectional view of the fifth wheel assembly of a tractor and the coupling steering mechanism of the trailer;

FIG. 3 is a top plan view of a portion of the structures shown in FIG. 2;

FIG. 4 is an enlarged fragmentary partial sectional view of one of the steerable wheeled axle assemblies shown in FIG. 1 of the drawings;

FIG. 5 is a top plan view of certain of the structures shown in FIG. 4;

FIG. 6 is an enlarged exploded perspective view of a portion of the structures shown in FIG. 4;

FIG. 7 is a side elevational view of the slide mechanism shown in FIG. 6;

FIG. 8 is a bottom plan view of the structures shown in FIG. 7;

DESCRIPTION OF THE PREFERRED EMBODIMENTS

Figure 9:
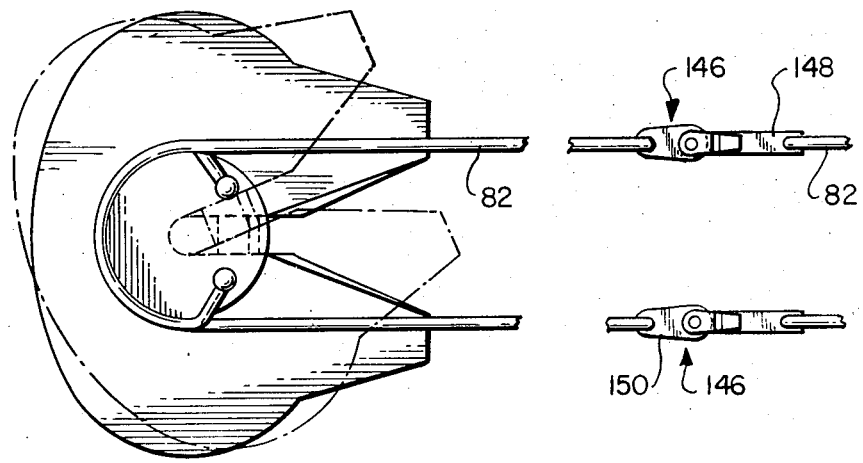
FIG. 9 is a fragmentary top plan view of modified means connecting the fifth wheel with the next rearward wheeled axle assembly.

Referring to the drawings and initially to FIGS. 1 through 8, there is illustrated a tractor-trailer assembly generally designated 10. The tractor trailer-assembly includes a towing tractor 12 and a trailer 14.

The towing tractor 12 is of conventional design and includes a chassis or frame 16 having steerable front wheel assemblies not shown and non-steerable drive wheel assemblies 20. The tractor also includes a cab 22 and a conventional fifth wheel assembly 24 providing the means for supporting the forward end of the trailer 14.

The trailer 14 generally includes a bed supported on extendable frame members 28, which frame members are supported at the rear end by wheeled axle assemblies generally designated 30, 31 and 32. The trailer also includes means 34 for connecting the trailer to the fifth wheel 24 of the tractor.

Referring particularly to FIGS. 2 and 3, the tractor fifth wheel assembly 24 includes the fifth wheel platform 40 which is pivotally mounted for limited tilting movement on a pin 42 mounted to a boss 44 secured to the tractor frame 16. The fifth wheel assembly is provided with a rearwardly extending slot generally designated 48 which slot includes a straight portion 50 and an outwardly and rearwardly tapered portion 52. The platform 40 of the fifth wheel assembly 24 includes a downwardly curved portion 54 adjacent the tapered portion of the slot 52.

Referring particularly to FIGS. 2 and 3, a plate 60', secured to the frame member 62 of the forward section of the trailer, carries a king pin 64, which king pin is received in the king pin slot 48 of the fifth wheel 40 of the tractor. Conventional locking means for retaining the king pin 64 in the fifth wheel slot 48 are included in the assembly but not shown in the drawings as they form no specific part of the present invention.

A steering control plate 60 is journalled about the king pin 64 via bearings not shown. The steering control plate 60 has secured thereto a depending crank arm 72 and an upstanding cylindrical shaft 74. The crank arm 72 is received in the fifth wheel slot 48 and in its operative position it is in the non-tapered straight portion 50 thereof. The shaft 74 has journalled thereabout a bearing 76. The generally circular peripheral wall of the sheering control plate 60 is inleted as at 78 and 78' to receive balled ends 80 and 80' of flexible draft members or tie members 82 and 82' with each of said members making a partial turn about the steering control plate 60, thence extending rearwardly through a cross-over to the first in the series of wheeled axle assemblies 30.

From the foregoing description, it will be seen that as the tractor turns, turning with it the fifth wheel 40, the slot 50 in the fifth wheel acting upon the crank arm 72 causes the steering control mechanism 60 to rotate about the king pin 64 shifting the position of the plate 60. This rotative movement in the plate 60 causes one of the tie members 82 and 82' to move forwardly and the other to move rearwardly depending upon the direction of turn. As hereinbefore described, the steering mechanism is particularly useful with a trailer of the extensible frame type. The nature of the extendable frame of the trailer is not critical to the inventive concepts disclosed herein and various types of extendable trailers may be employed with the present invention. Several forms of extendable frames are shown and described in my said co-pending application Ser. No. 93,685 hereinbefore referred to.

In the illustrated form of the invention the rearward portion of the trailer is provided with three separate wheel axle assemblies 30, 31 and 32, of which assemblies 30 and 32 are controllably steerable.

Each axle assembly 30 and 32 includes a frame 90, the upper surface 92 of which supports a bearing ring race 94 while the trailer frame members 28 have secured to the under surfaces thereof cooperating ring race 96 and balls 98 are retained therebetween, as more clearly shown in FIGS. 4 and 5.

The frames carry axle support members 100 which may include conventional springs or "air springs" such as shown at 102. As more clearly shown in FIGS. 6, 7 and 8, each axle frame 90 has a forwardly, or rearwardly, projecting lever arm 106. The lever arms 106 may be braced by structural members such as 108 and 108' and each lever arm is longitudinally slotted as at 110.

Each steering axle assembly 30 and 32 also has associated therewith a vertically mounted shaft 112. Each shaft is journalled in suitable bearing means 114 secured to the structural frame member 28 of the trailer.

The upper end of each shaft 112 has secured thereto a pulley 116 for axle assembly 30 and 118 for axle assembly 32. Pulley 112 has tie members 82 and 82' trained thereabout in addition to tie members 120, 120' which extend rearwardly to pulley 118 of axle assembly 32 as to be more fully described hereinafter.

At the lower end of the shaft 112 is secured a lever arm 122 in the form of a "C" shaped channel member. Centrally disposed within the "C" channel is a lead screw 124 journalled in bushings 126 and 128 secured, respectively, to front and rear plate members 130 and 132, as more clearly shown in FIG. 8 of the drawings. Within the "C" channel is mounted a carriage 134, having threads which mate with the threads on the lead screw 124, whereby rotation of the lead screw in one direction causes the carriage 134 to move towards end 130 and rotation in the opposite direction moves the carriage toward end 132.

Secured to and depending from the carriage is a pivot pin 136 sized to be slidably and snugly received in slot 110 in the lever arm 106 secured to frame 90.

The lead screw 124 is actuated via a simple crank 138 secured to the forward end of the lead screw, outboard of bushing 126.

From the foregoing it will be seen that rotation of the pulley 116, by movement of tie members 82, 82', rotates shaft 112, which in turn rotates lever arm 122, and depending on the position of the pivot pin 136, frame 90 and its attached wheels are pivoted. With the pin 136 in the full line position as shown in FIG. 7 and with the pulley 116 being rotated in the direction of the directional arrow "A", lever arm 106 is moved in the direction of directional arrow "B". If the pivot pin 136 is moved to the phantom line position, as shown in FIG.

7, so that it is in axial alignment with shaft 112, movement of the pulley 116 in either direction has no effect on the lever arm 106. Whereas, if the pin 136 is moved forwardly of its phantom line position, rotation of the pulley in the direction of directional arrow "A" will cause the lever arm 106 to move in a direction opposite to the direction of directional arrow " B". Thus, the operator has full control of the steering of each steerable axial assembly for a predetermined turning motion of the tractor 12 to thereby compensate for the length of the trailer.

If the trailer frame is lengthened or shortened, the tie members 82, 82' and 120,120' require length adjustment and these tie members are provided with turn buckle type connectors 140 which permit the insertion and removal of lengths of tie and minor adjustments in the installed lengths.

Figure 10:
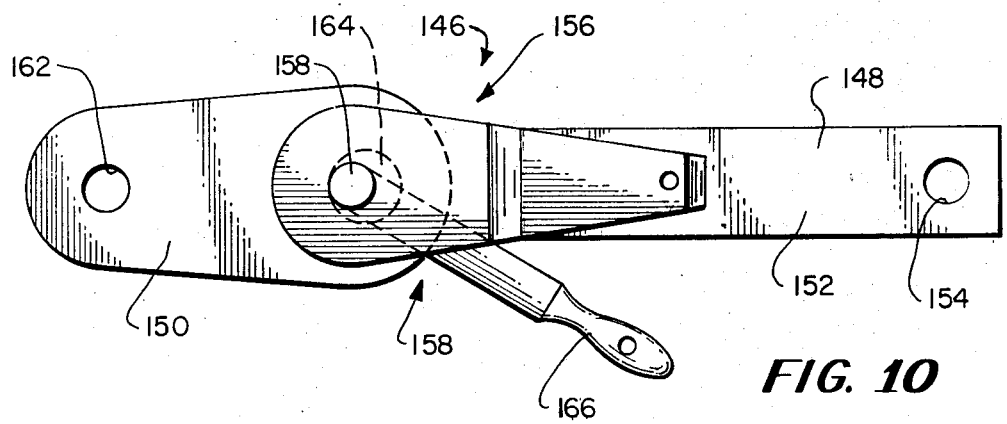
FIG. 10 is an enlarged view of an eccentric takeup means of the tie members shown in FIG. 9.
Figure 11:
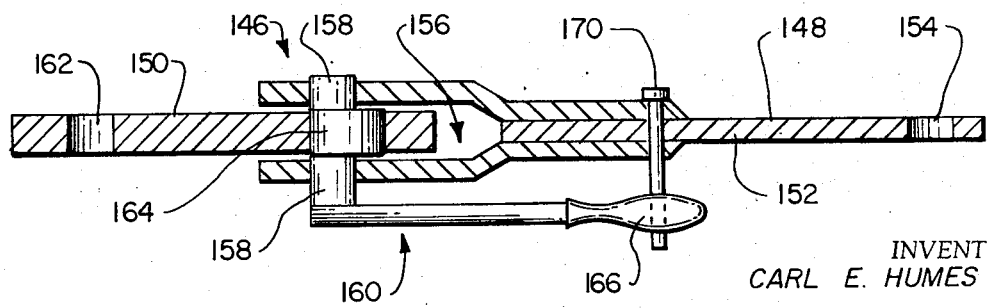
FIG. 11 is a transverse section through the structures illustrated in FIG. 10.

Referring to FIGS. 9, 10 and 11, novel quick disconnects and tie member tightening means generally designated 146 are shown, which elements would replace or be used in conjunction with the conventional turnbuckles 140 heretofore described.

Each member 146 comprises a pair of elements 148 and 150. Portion 148 comprises a plate 152 having a bore 154 at one end, which bore receives one end of the tie element 82. The other end of plate 152 is bifurcated as at 156 with each furcation being bored to receive a shaft 158 of an eccentric member 160. The other element 150 of the adjustable coupling 146 is bored as at 162 and receives a free end of tie member 82. The opposite end is received between the furcations 156 and is bored to receive an enlarged can or eccentric portion 164.

One or both extended end of shafts 158 has secured thereto an actuating handle or lever 166. It will be seen, particularly from FIG. 10, that as pins 158 are rotated by actuation of handle 166, the can surface member 164 causes the two ends of tie member 82, FIG. 9, to move toward or away from each other. The shape of the cam surface 164 is so related to the position of the handle 166 that when the handle is positioned below and parallel to plate 148 and retaining pin 170 is in place, the maximum take-up of the tie members 82, 82' is obtained. With the handle rotated 180° the minimum take-up is provided and the slack in the tie members 82, 82' permits ready separation of these elements from their respective ends 148 and 150.

While the mechanism for controllably steering wheeled axle assemblies of trailers has materially improved operation of trailers and substantially reduced tire wear, such mechanisms increase the likelihood of trailer jackknifing if it becomes necessary to apply the vehicle brakes when the trailer is traversing a curved path. Since the mass of the trailer and its load has a tendency to continue in a path in a direction of the turned wheels, application of the vehicle brakes causes the trailer to continue in the direction of movement of the turned wheels and anything in the path of the trailer is in danger of being destroyed.

In my U.S. Pat. No. 3,533,644, there is disclosed the use of coil springs, torsion bars and the like connected to steerable trailer axle assemblies which means continuously urge the axle assemblies into normal relationship to the longitudinal axis of the trailer. While such means greatly reduce the tendency for vehicles to jackknife or to continue in a curved path following the application of the vehicle's brakes, such means have not proven entirely satisfactory as the momentum of the vehicle can overcome the resilience of the spring or the torque of the torsion bar. The advantages of the system disclosed in my said U.S. Pat. No. 3,533,644 of having resilient tension constantly applied to urge the vehicle wheels into a normal straight tracking position while permitting rigid positive anchoring of the wheeled axle assemblies in a straight tracking position are provided by the system illustrated by way of example in FIG. 12.

Figure 12:
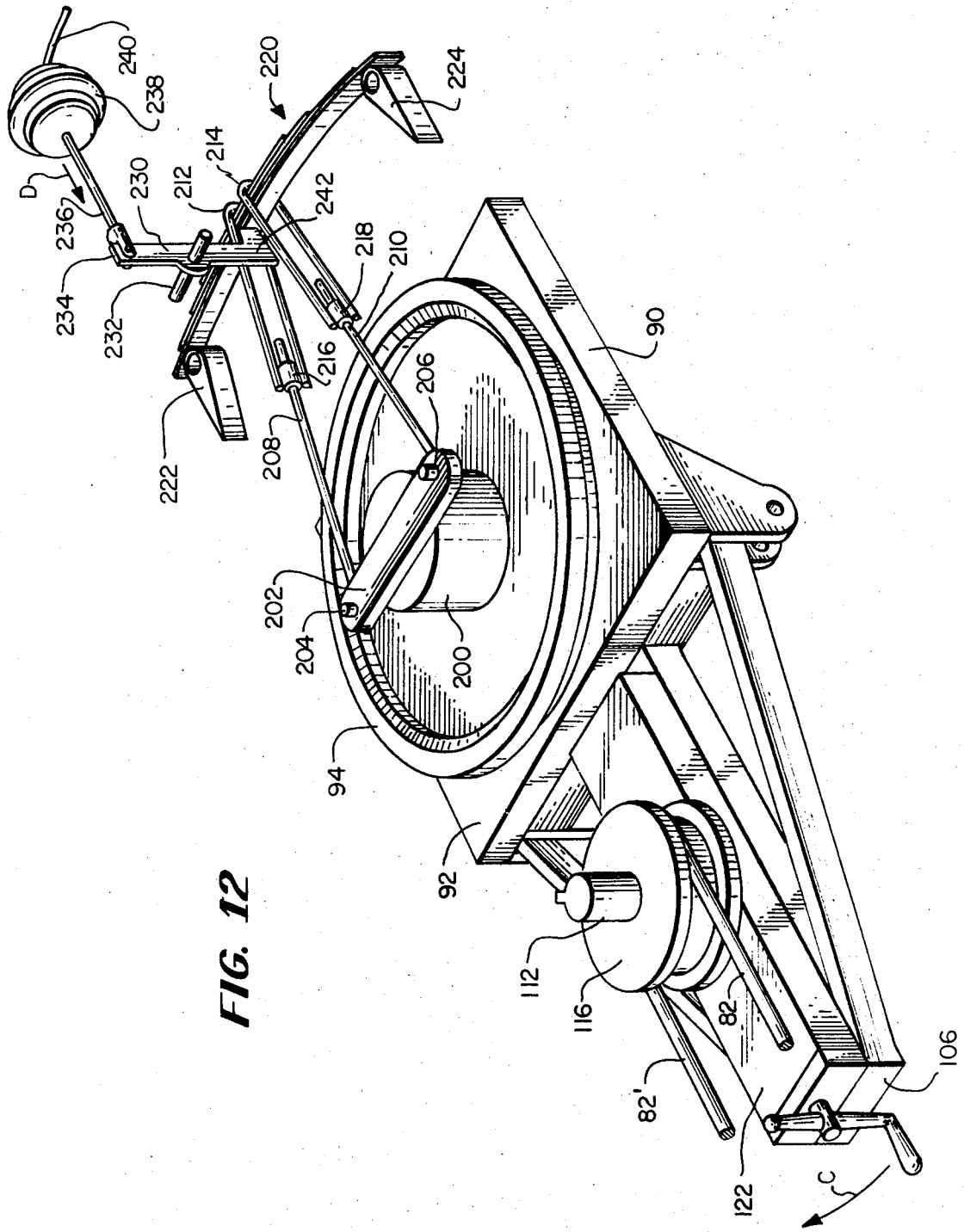
FIG. 12 is a perspective view of a modified form of the invention illustrating one form of anti-jackknife means of the invention.

Referring to FIG. 12, where like parts are provided with reference characters corresponding to those employed in FIGS. 1 through 11, there is shown a platform 90 to which is secured one or more wheeled axles. The platform 90 is provided with a forwardly extending lever arm 106 which cooperates with rotatable lever 122 secured to shaft 112 and which in turn is rotated by pulley 116 via tie members 82 and 82'. The top surface 92 of the frame 90 includes the ball race and in addition an upstanding structural member 200, the center of which is located on the center or rotation of the race 94. Secured to member 200 is a cross-arm 202 having connecting posts 204 and 206 at its extended ends. Each post 204 and 206 is connected via tie rods 208 and 210 to U-shaped slide members 212 and 214 having threaded takeup couples 216 and 218, respectively, at their forward ends.

The rearward ends of the U-shaped slide members 212 and 214 engage a conventional leaf spring assembly generally designated 220. The leaf spring assembly is rigidly attached at its ends by attaching members 222 and 224 to suitable cross members or the longitudinal frame members 28 of the trailer main frame.

From the foregoing, it will be seen that if the platform 90 is moved by tie members 82 and 82' in the direction of the directional arrow "C", spring 220 is compressed by U-shaped slide member 214 being pulled generally forwardly via cross member 202 and tie rod 210 while similarly U-shaped slide member 212 merely slides rearwardly about the spring. With the spring 220 tensioned, the wheel axle assembly is constantly urged back to its normal straight tracking position. Movement of the platform 90 in the opposite direction tensions the same spring 220 via U-shaped slide members 212 while U-shaped slide members 214 slides rearwardly. Assuming the trailer is in a turn in the direction of the directional arrow "C" and it becomes necessary for the operator to apply the vehicle's brakes, the spring 220 is positively returned to its normal position which in turn rotates the platform 90 to the wheel straight tracking position by application of a positive force via lever arm 230 pivoted to pin 232, the outboard ends of which are journalled in suitable bearings secured to the trailer main frame.

The upper end 234 of the lever 230 is connected to the actuating rod 236 of air cylinder 238, which air cylinder may be identical to the air cylinders employed in the vehicle's braking system. The air cylinder is connected to the source of pressure fluid via line 240, which source is preferably the same source as used in actuating the vehicle's brakes. Upon application of pressure fluid to thecylinder 238, the rod 236 moves in the direction of the directional arrow "D" pivoting the lever arm 230 about pin 232 whereby the shoe 242 urges the spring 220 rearwardly into a rigid structure applying force to U-shaped slide member 214 until the wheels connected to the platform 90 are normal to the longitudinal axis of the trailer main frame.

While the assembly illustrated in FIG. 12 may be applied to one or all of the steerable axle assemblies, it will also be appreciated by those skilled in the art that such mechanisms may also be secured between the fifth wheel 24 and the main frame members 28 of the trailer and such use may be in conjunction with similar mechanisms employed with the steerable axle assemblies.

From the foregoing description of various embodiments of the present invention, it will be seen that novel steering means are provided for extendable trailers, which steering means permit varying the steering ratio between the tractor and the steerable wheels to accommodate for the different lengths of the trailer. It will be appreciated by those skilled in the art that the present invention also permits the addition and removal of certain of the wheel axle assemblies so that where extremely heavy loads are to be transported as many as, for example, 8 axle assemblies may be inserted under a vehicle and after the load is removed therefrom the axles can be removed and transported on top of the trailer thereby further reducing tire wear where multiple tires are not required.

I claim:

1. A multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, at least one wheeled axle assembly for the trailer, means mounting the wheeled axle assembly for controlled pivotal movement relative to the trailer main frame, said mounting means including a vertical shaft mounted on the trailer frame for rotation relative thereto, a first lever arm secured to rotate with the shaft, a king pin carried at the forward end of the trailer, a plate mounted concentric to the king pin, a depending arm secured to the plate eccentric to the king pin and adapted to be snugly received in the fifth wheel slot rearwardly of the king pin, a second lever arm secured to said wheeled axle assembly and adapted to rotate on a vertical axis, a selectively adjustable slide member carried by the first lever arm to vary the degree of turning movement of said wheeled axle assembly, means pivotally connecting one end of the slide member to said second lever arm, and tie members connecting the first lever arm and the plate outboard of their pivotal axes.

2. The invention defined in claim 1 wherein the length of the tie members are variable to accommodate for variations in the length of the trailer.

3. The invention defined in claim 1 wherein the first lever arm includes a lead screw, said slide member is threadedly engaged thereto and said lead screw is connected to a hand actuated crank.

4. The invention defined in claim 1 wherein the vertical axis of said first lever arm is positioned intermediate the length of the lever arm and said adjustable slide member is movable to either side of said vertical axis.

5. The invention defined in claim 1 including spring means carried by the trailer, rigid tie members connecting said spring means to said at least one wheeled axle assembly and means actuated by the trailer braking system for immobilizing said spring.

6. The invention defined in claim 5 wherein said spring immobilizing means includes an air cylinder and a rocker arm movable into spring engaging position upon actuation of the air cylinder.

7. The invention defined in claim 6 wherein the means connecting the wheeled axle assembly to said spring includes generally U-shaped slide members.

8. The invention defined in claim 5 wherein each of the pivotally mounted wheeled axle assemblies includes said spring means.

9. A multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, at least one wheeled axle assembly for the trailer, means mounting the wheeled axle assembly for controlled pivotal movement relative to the trailer main frame, said mounting means including a vertical shaft mounted on the trailer frame for rotation relative thereto, a first lever arm secured to rotate with the shaft, a king pin carried at the forward end of the trailer, a plate mounted concentric to the king pin, a depending arm secured to the plate eccentric to the king pin and adapted to be snugly received in the fifth wheel slot rearwardly of the king pin, a second lever arm secured to said wheeled axle assembly and adapted to rotate on a vertical axis, a selectively a a slide member carried by the first lever arm to vary the degree of turning movement of said wheeled axle assembly, means pivotally connecting one end of the slide member to said second lever arm, tie members connecting the first lever arm and the plate outboard of their pivotal axes, the selectively actuatable rigid tie members overcoming the rotation of the lever arms.

10. The invention defined in claim 9 wherein said selectively actuatable means includes spring means carried by the trailer, rigid tie members connecting said spring to said at least one wheeled axle assembly and means actuated by the trailer braking system for immobilizing said spring means.

* * * * *

UNITED STATES PATENT OFFICE
CERTIFICATE OF CORRECTION

Patent No. 3,689,107          Dated September 5, 1972

Inventor(s)  Carl E. Humes

It is certified that error appears in the above-identified patent and that said Letters Patent are hereby corrected as shown below:

Claim 9, line 42 "a a" should read "adjustable".

Signed and sealed this 22nd day of May 1973.

(SEAL)
Attest:

EDWARD M. FLETCHER, JR.          ROBERT GOTTSCHALK
Attesting Officer                Commissioner of Patents